Figure 1:
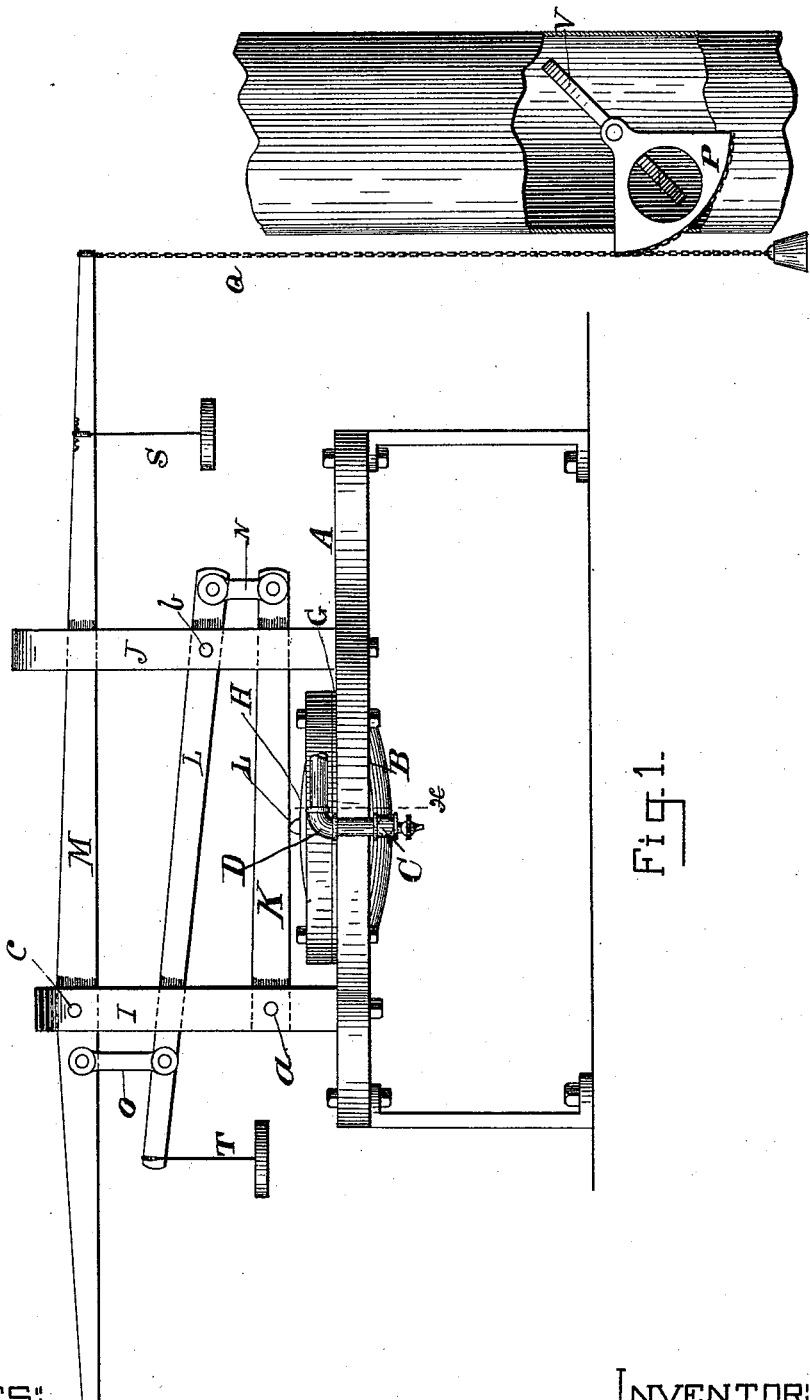

(No Model.) 2 Sheets—Sheet 1.
G. NEWTON.
AUTOMATIC STEAM DAMPER REGULATOR.

No. 478,127. Patented July 5, 1892.

WITNESSES:
M. E. O'Brian
Ellis S. Chesbrough

INVENTOR:
George Newton.
by G. L. Chapin.
Atty.

(No Model.) 2 Sheets—Sheet 2.
G. NEWTON.
AUTOMATIC STEAM DAMPER REGULATOR.
No. 478,127. Patented July 5, 1892.
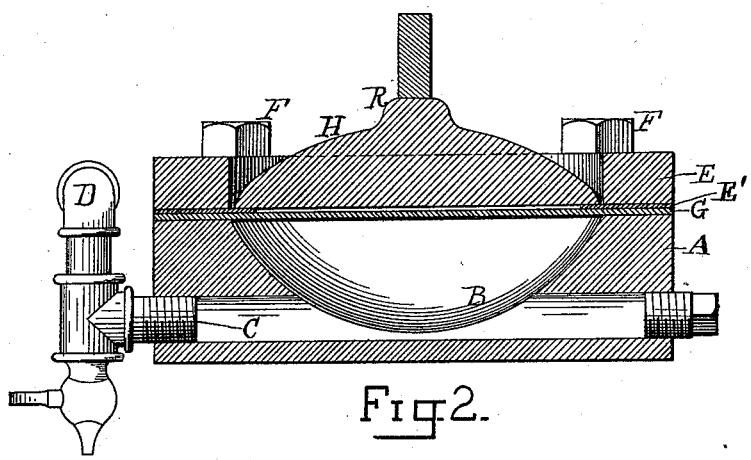
Fig. 2.
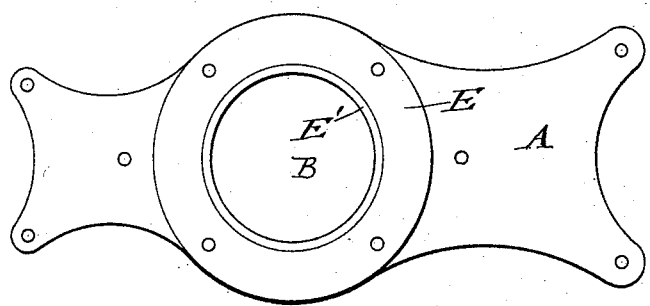
Fig. 3.
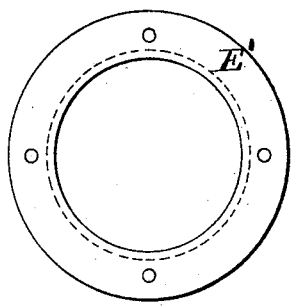
Fig. 4.
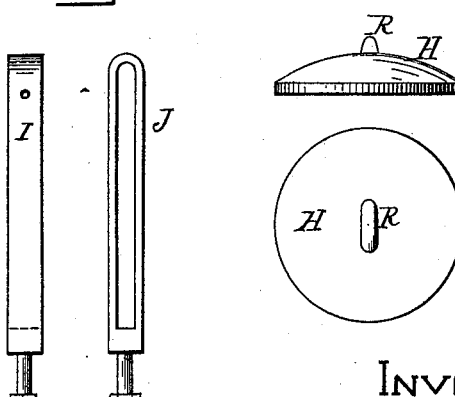
Fig. 5.
WITNESSES:
M. E. O'Brian
Ellis S. Chesbrough
Fig. 6.
INVENTOR:
George Newton
by G. L. Chapin
Atty

UNITED STATES PATENT OFFICE.

GEORGE NEWTON, OF CHICAGO, ILLINOIS.

AUTOMATIC STEAM-DAMPER REGULATOR.

SPECIFICATION forming part of Letters Patent No. 478,127, dated July 5, 1892.

Application filed February 13, 1891. Serial No. 381,393. (No model.)

*To all whom it may concern:*

Be it known that I, GEORGE NEWTON, a citizen of the United States, residing at Chicago, county of Cook, and State of Illinois, have invented new and useful Improvements in Automatic Steam-Damper Regulators, of which the following is a specification, reference being had to the annexed drawings, (two sheets,) in which—

Figure 1 is a side elevation of invention and improvement as when applied for use. Fig. 2, Sheet 2, is an enlarged vertical sectional elevation of Fig. 1 on line $x$. Fig. 3 is a plan of the bed-plate of the device, the thin brass washer, and the main ring, by which the said washer and the rubber disk or gasket are held to the bed-plate, the rubber disk being broken away to show the bottom of the steam-chambers below. Fig. 4 is a plan view of the annular brass washer which is interposed between the rubber disk and the main ring above removed from the other portions of the device. Fig. 5 is a plan and elevation of the disk which operates within the main ring, and is operated by the rubber disk to act on the lower member of the compound lever. Fig. 6 are two different elevations of the lever-guides above the bed-plate.

The nature and construction of this invention will be fully comprehended by the following detail description.

A represents a bed-plate with an opening in its top portion and leading into a chamber B below, the plate and chamber being made, as a matter of choice, of the same piece of metal. A pipe C communicates with the chamber B and with the steam-boiler, suitable connections D, with pipes $c$, for this purpose being made, as shown at Figs. 1 and 2. An annular plate or ring E is by suitable bolt-holes and bolts F securely fastened to the bed-plate A, and between the said plate and ring E is placed a disk or gasket G, which is made of rubber or other suitable flexible material, and between the rubber disk and the main ring E is placed a thin brass washer E', which is interposed between the rubber disk and the reciprocating disk H, the said washer projecting inward from the inner periphery of the main ring for that purpose and to prevent the rubber disk from injury by the action of disk H.

Secured to and projecting above the bed-plate A are two slotted standards I and J, which support and guide levers K, L, and M. The lever K is pivoted to standard I at $a$, and, projecting through standard J, is connected with lever L by a link N. The lever L is pivoted to standard J at $b$, extends through standard I, and is connected with lever M by a link O, and the lever M is pivoted to standard I at $c$ and projects through standard J to a convenient point to connect with the damper-segment P by a chain or wire rope Q. The opposite end of the lever M projects through the standard I to be employed, if required, to regulate the ash-pit door. As a part of and projecting up from the disk H is a bearing R, suitable to engage the lever K. A graduating-weight S is suspended from lever M to compensate for the different pressures of steam in the boiler, and a counterbalancing-weight T is employed in some cases to obtain a finer adjustment of the device to the pressure of steam.

In practice steam is admitted to chamber B by means of a pipe leading from the steam-boiler to the connection D, and so soon as the said chamber becomes filled with water from condensed steam the steam forces the water against the gasket, and by that means the disk H is elevated sufficiently to regulate the damper V by means of the compound-lever movement and chain attachment.

Having thus described my invention, I claim and desire to secure by Letters Patent of the United States—

An improvement in automatic steam-damper regulators, consisting of the bed-plate A, having therein a chamber, and an opening therefrom leading up through the plate, and a steam-pipe communicating with said chamber, in combination with a flexible disk placed over the opening to the chamber, a thin annular washer placed on the flexible disk and projecting inward over the margin of the opening in the top of plate A, and a ring which secures the flexible disk and washer to said plate, and a disk which lies within the ring and is operated vertically by the flexible disk, standards secured to and projecting up from the said plate and compound levers pivoted to the standards and acted on by a bearing on the said disk, a compensating weight supported by one lever, the damper V, and connections P Q, all constructed and operating substantially as described.

GEORGE NEWTON.

Witnesses:
RUTH HARRISON,
H. F. HARRISON.